US010110925B2

(12) United States Patent
Lin et al.

(10) Patent No.: US 10,110,925 B2
(45) Date of Patent: Oct. 23, 2018

(54) METHOD OF REFERENCE PICTURE SELECTION AND SIGNALING IN 3D AND MULTI-VIEW VIDEO CODING

(71) Applicant: HFI Innovation Inc., Zhubei, Hsinchu County (TW)

(72) Inventors: Jian-Liang Lin, Yilan (TW); Yi-Wen Chen, Taichung (TW); Yu-Wen Huang, Taipei (TW); Yu-Lin Chang, Taipei (TW)

(73) Assignee: HFI Innovation Inc., Zhubei, Hsinchu County (TW)

( * ) Notice: Subject to any disclaimer, the term of this patent is extended or adjusted under 35 U.S.C. 154(b) by 472 days.

(21) Appl. No.: 14/485,817

(22) Filed: Sep. 15, 2014

(65) Prior Publication Data

US 2015/0195506 A1    Jul. 9, 2015

Related U.S. Application Data

(60) Provisional application No. 61/923,414, filed on Jan. 3, 2014.

(51) Int. Cl.
 *H04N 13/00* (2018.01)
 *H04N 19/70* (2014.01)
 (Continued)

(52) U.S. Cl.
 CPC .......... *H04N 19/70* (2014.11); *H04N 19/597* (2014.11); *H04N 19/105* (2014.11)

(58) Field of Classification Search
 CPC ........ H04N 13/00; H04N 19/52; H04N 19/70; G02B 27/22; G09G 3/003; G06F 3/011
 See application file for complete search history.

(56) References Cited

U.S. PATENT DOCUMENTS

| 8,923,402 B2 | 12/2014 | Lee et al. |
| 2012/0114036 A1 | 5/2012 | Po |

(Continued)

FOREIGN PATENT DOCUMENTS

| CN | 102438167 A | 5/2012 |
| CN | 102625097 A | 8/2012 |

(Continued)

*Primary Examiner* — Dave Czekaj
*Assistant Examiner* — Berteau Joisil
(74) *Attorney, Agent, or Firm* — Oblon, McClelland, Maier & Neustadt, L.L.P.

(57) ABSTRACT

A method of video coding utilizing ARP (advanced residual prediction) by explicitly signaling the temporal reference picture or deriving the temporal reference picture at the encoder and the decoder using identical process is disclosed. To encode or decode a current block in a current picture from a dependent view, a corresponding block in a reference view corresponding to the current block is determined based on a DV (disparity vector). For the encoder side, the temporal reference picture in the reference view of the corresponding block is explicitly signaled using syntax element(s) in the slice header or derived using an identical process as the decoder. For the decoder side, the temporal reference picture in the reference view of the corresponding block is determined according to the syntax element(s) in the slice header or derived using an identical process as the decoder. The temporal reference picture is then used for ARP.

15 Claims, 6 Drawing Sheets

(51) Int. Cl.
*H04N 19/597* (2014.01)
*H04N 19/105* (2014.01)

(56) References Cited

U.S. PATENT DOCUMENTS

| | | | |
|---|---|---|---|
| 2013/0176390 A1* | 7/2013 | Chen | H04N 19/597 348/43 |
| 2013/0272403 A1* | 10/2013 | Ramasubramonian | H04N 19/463 375/240.13 |
| 2014/0161189 A1* | 6/2014 | Zhang | H04N 19/597 375/240.16 |
| 2014/0253681 A1* | 9/2014 | Zhang | H04N 13/0048 348/43 |

FOREIGN PATENT DOCUMENTS

| | | |
|---|---|---|
| TW | 201238353 | 9/2012 |
| WO | WO 2006/062377 | 6/2006 |
| WO | WO 2013/159643 | 10/2013 |

\* cited by examiner

METHOD OF REFERENCE PICTURE SELECTION AND SIGNALING IN 3D AND MULTI-VIEW VIDEO CODING

CROSS REFERENCE TO RELATED APPLICATIONS

The present invention claims priority to U.S. Provisional Patent Application Ser. No. 61/923,414, filed on Jan. 3, 2014, entitled "Method of the Reference Picture Signaling for Inter-view Residual Prediction in 3D and Multiview Video Coding". The U.S. Provisional Patent Application is hereby incorporated by reference in its entirety.

FIELD OF THE INVENTION

The present invention relates to three-dimensional video coding. In particular, the present invention relates to reference picture selection and signaling in 3D and multi-view video coding.

BACKGROUND AND RELATED ART

Three-dimensional (3D) television has been a technology trend in recent years that intends to bring viewers sensational viewing experience. Various technologies have been developed to enable 3D viewing. The multi-view video is a key technology for 3DTV application among others. The traditional video is a two-dimensional (2D) medium that only provides viewers a single view of a scene from the perspective of the camera. However, the multi-view video is capable of offering arbitrary viewpoints of dynamic scenes and provides viewers the sensation of realism. 3D video formats may also include depth maps associated with corresponding texture pictures. The depth maps also have to be coded to rendering three-dimensional view or multi-view.

Various techniques to improve the coding efficiency of 3D video coding have been disclosed in the field. There are also development activities to standardize the coding techniques. For example, a working group, ISO/IEC JTC1/SC29/WG11 within ISO (International Organization for Standardization) is developing an HEVC (High Efficiency Video Coding) based 3D video coding standard (named 3D-HEVC). In 3D and multi-view coding, since all cameras capture the same scene from different viewpoints, a multi-view video contains a large amount of inter-view redundancy. To share the previously encoded residual information of adjacent views, the residual signal for a current block (PU) can be predicted by the residual signal of one or more corresponding blocks, which are located by a disparity vector (DV), in the inter-view pictures.

Figure 1:
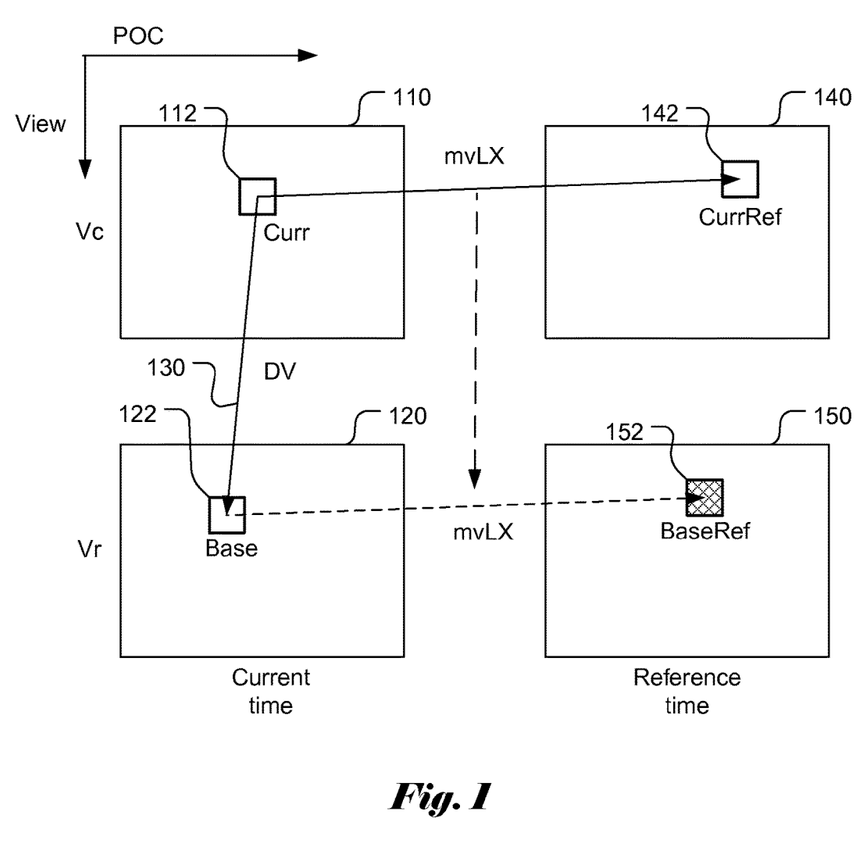
FIG. 1 illustrates an example of prediction structure for advanced residual prediction (ARP) in three-dimensional video coding based on High Efficiency Video Coding (3D-HEVC), where the current block is coded using temporal prediction.

FIG. 1 illustrates an example of advanced residual prediction (ARP) according to the current design of 3D-HEVC (HTM-9.0), where the residual signal in a current view using temporal prediction is predicted by a residual prediction signal in a reference view. The main procedures of ARP can be described as follows for the case that the current prediction unit (PU) uses temporal prediction (i.e., the reference picture is a temporal reference picture):

1. The temporal reference block (CurrRef 142) in a reference picture (140) of the current view (Vc) is located from the location of the current block (Curr 112) using a motion vector (denoted as mvLX, X=0 or 1) and the reference index of the current block in the current picture (110) of the current view (Vc).
2. The corresponding block (Base 122) in the reference picture (120) of the reference view corresponding to the current block (Curr 112) is located from the location of the current block (Curr 112) using a derived disparity vector (DV) of the current block (Curr 112).
3. The temporal reference block (BaseRef 152) for the corresponding block (Base 122) in the reference view (Vr) is located by re-using the temporal motion information (i.e., mvLX and the reference index) of the current block (Curr 112).
4. To reduce the bandwidth of memory access, the motion vector mvLX from the current block is scaled towards a fixed reference picture before performing motion compensation according to the current 3D-HEVC (HTM-9.0) standard when the weighting factor is not 0. Specifically, the fixed reference picture is defined as the first temporal reference picture of each reference picture list.
5. The residual predictor of the temporal residual signal of current PU/block can be calculated as the difference between these two respective blocks in the reference view (i.e., Base−BaseRef). In other words, the current residuals, (Curr−CurrRef) are predicted by reference residuals, (Base−BaseRef).

Figure 2:
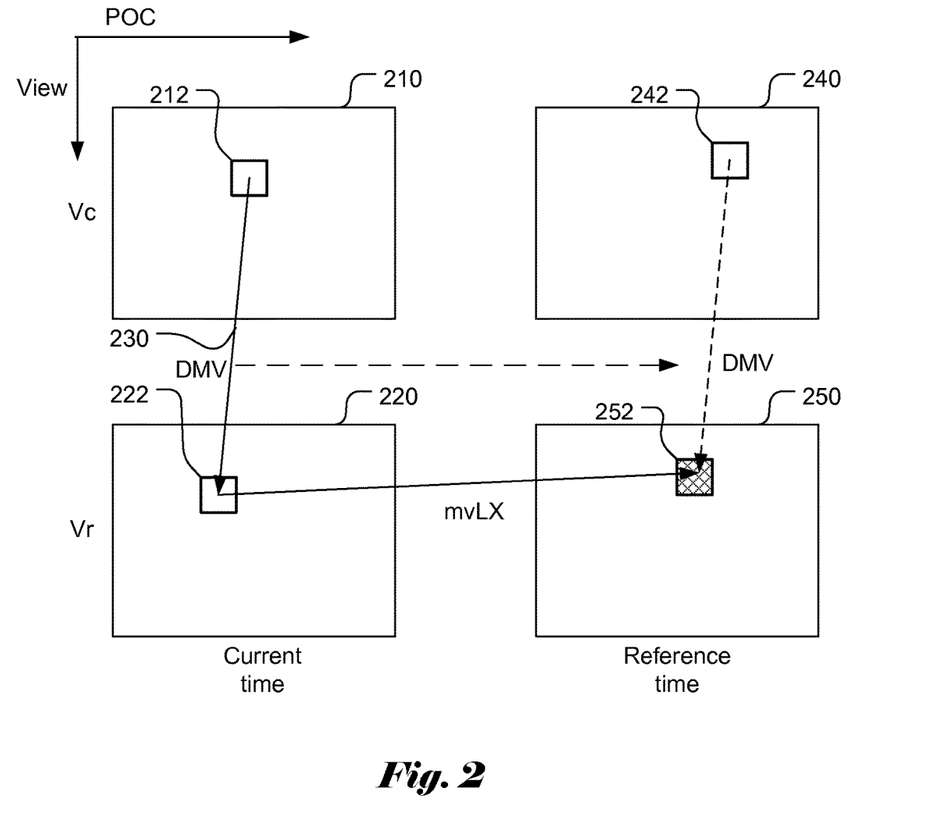
FIG. 2 illustrates an example of prediction structure for advanced residual prediction (ARP) in three-dimensional video coding based on High Efficiency Video Coding (3D-HEVC), where the current block is coded using inter-view prediction.

When the current PU uses inter-view prediction (i.e., the reference picture is an inter-view reference picture) instead of temporal prediction, the main procedures of ARP can be described as shown in FIG. 2.

1. The inter-view reference block (Base 222) of the reference view picture (320) in the reference view (Vr) is located by the disparity motion vector (330) of the current block (Curr 212) of the current picture (210) in the current view (Vc).
2. The temporal reference block (BaseRef 252) of the inter-view reference block (Base 222) in the reference view is located using the temporal motion vector (mvLX) and reference index, where L0 motion information is used first; if L0 motion information is not available, L1 motion information is then used.
3. A current reference block (CurrRef 242) with respect to the current block in the current view is located from the location of the temporal reference block (BaseRef 252) of the inter-view reference block (Base 222) in the reference view by re-using the disparity motion vector (DMV 230) of the current block (212).
4. To reduce the bandwidth of memory access, in current 2D-HEVC (HTM-9.0), the motion vectors mvL0 (or mvL1) from the inter-view reference block (Base 222) is scaled towards a fixed reference picture before performing motion compensation when the weighting factor is not 0. The fixed picture is defined as the first temporal reference picture of each reference picture list. However, when mvL0 from Base is invalid, the motion vector mvL1 from Base will be used. If both mvL0 and mvL1 from Base are invalid, a zero vector will be used and the reference picture will be set as the first temporal reference picture of that prediction direction of current block (list 0 or list 1). A motion vector from the inter-view reference block (Base 222) may be invalid if the inter-view reference block (Base 222) has no L0 MV, or the list 0 prediction for the inter-view reference block (Base 222) is inter-view disparity compensated prediction.
5. The current inter-view prediction residuals are calculated according to (Curr−Base). The residual predictor of the inter-view residual signal of current PU/block can be calculated as the difference between these two respective blocks in a reference time, i.e., another access unit (CurrRef−BaseRef).

Figure 3:
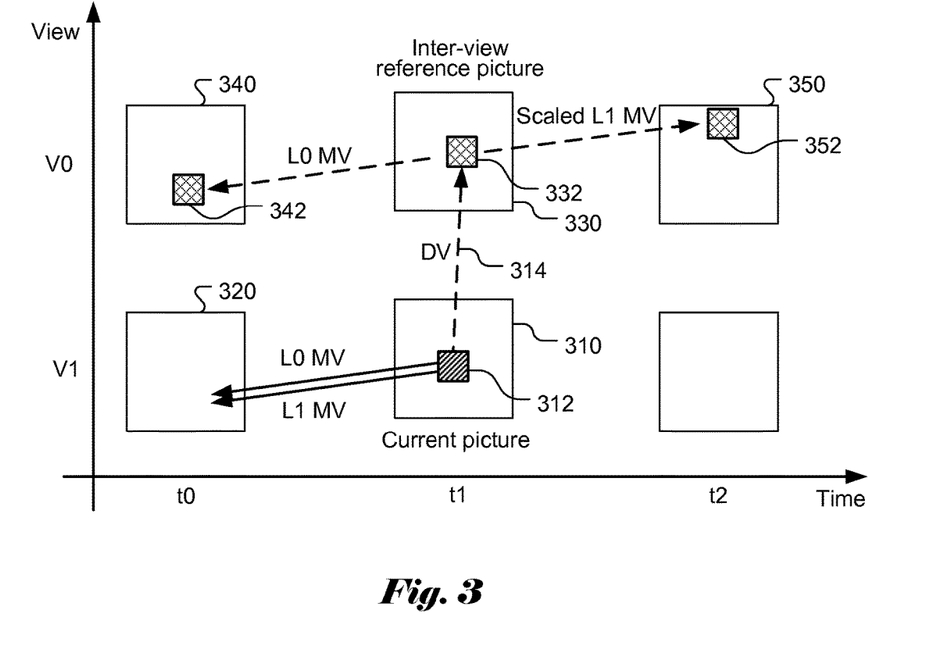
FIG. 3 illustrates an example of an issue with existing three-dimensional video coding based on High Efficiency Video Coding (3D-HEVC), where a current block is coded using advanced residual prediction (ARP) with bi-prediction.
Figure 4:
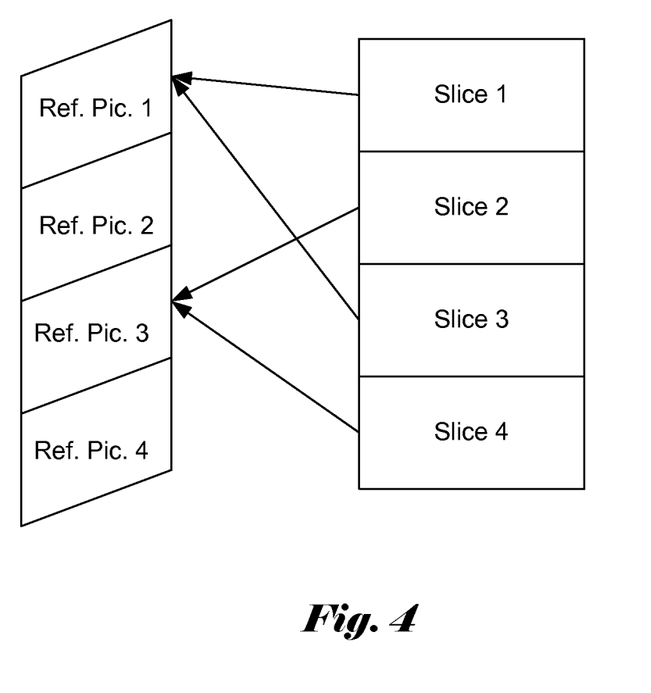
FIG. 4 illustrates an example of an issue with existing three-dimensional video coding based on High Efficiency Video Coding (3D-HEVC), where the temporal reference picture changes between slices.

In ARP, the first temporal reference picture of each reference list in the reference view (i.e., V0) is selected as the reference picture of the corresponding block as shown in FIG. 1. The motion vectors of the current PU are then scaled towards the selected reference picture of the corresponding block in the reference view to generate the predicting residual signal by performing motion compensation. When the current PU is bi-prediction coded and with identical motion for list 0 and list 1, different predicting residual signals may be generated for list 0 and for list 1 due to different reference pictures for list 0 and list 1 as shown in FIG. 3. Picture 310 corresponds to the current picture in view 1 (V1) and block 312 corresponds to the current prediction unit (PU). Disparity vector (DV) 314 of the current PU points to a corresponding block (332) in an inter-view reference picture (330) in the reference view (V0). In this example, the corresponding block (332) refers to a same reference picture in list 0 as the current block (312). However, the corresponding block (332) refers to a reference picture (350) in list 1 different from the current block (312) as shown in FIG. 3. The list-1 MV is scaled to the reference picture (350) in the opposite direction. It may result in degradation of the prediction performance by scaling a MV to the reference picture in the opposite direction when a reference picture in the same direction is available.

According to the existing standard development, the first temporal reference picture in the reference picture list is used as the reference picture for the corresponding block. Thus, even a change of reference list reordering between slices in the same picture may cause the reference picture of the corresponding block to change. Frequent reference picture changes of the base view may create a performance burden for decoders, due to DRAM (dynamic random access memory) access limitations.

For high-performance decoders, optimization of DRAM accesses is critical to efficient implementations. Newer generations of DDR (double data rate) DRAM supports much higher bandwidth. However, a system must be designed to use large burst sizes and allow longer latencies in order to achieve bandwidth efficiency. Furthermore, since the temporal reference data (such as temporal reference pictures) is too large to store on-chip, the temporal reference data usually is stored in DRAM. The decoder has to read multiple LCUs (largest coding units) worth of data in a single burst to satisfy the memory access efficiency requirement. Often, a system uses pipeline structure to achieve memory bandwidth efficiency. Accordingly, it has to fetch this data well in advance before it is used by the LCU to mitigate the long memory latency. The practice of allowing the reference picture of the corresponding block to change from slice to slice will interrupt this pipeline model. In the worst case, this practice may even cause the ultimate bottleneck on the decoder performance.

In the current 3D-HEVC (High Efficiency Video Coding (HEVC) based three-dimensional coding), there is a checking mechanism to check if the reference picture used in the current view (the first temporal reference picture in that list) has a corresponding reference picture with the same POC in the reference view to generate list X (X∈{0, 1} predicting residual signal. Besides checking the POC value, it also checks if the reference picture in the reference view is in the decoded picture buffer and marked as "used for reference" and if the reference picture is a texture picture (i.e., a non-depth picture). In addition, it also checks the view index. This process is invoked when the current slice is a P or B slice. The derivation process for the target reference index for residual prediction according to the existing 3D-HEVC standard development is illustrated as below.

The variables RpRefIdxL0 and RpRefIdxL1 corresponding to the reference picture index for ARP in list 0 and list 1 respectively are set equal to −1, the variables RpRefPicAvailFlagL0 and RpRefPicAvailFlagL1 corresponding to flags indicating whether the reference picture for ARP is available in list 0 and list 1 respectively are set equal to 0. The following procedure applies for list X, where X∈{0, 1}, When X is equal to 0 or the current slice is a B slice the following applies:

For $i$ in the range from 0 to num_ref_idx_$lX$_active_minus1, inclusive, the following applies: (O-1)

When PicOrderCnt(RefPicList$X$[$i$])!=PicOrderCntVal and RpRefPicAvailFlag$LX$==0, the following applies: (O-2)

RpRefIdx$LX$=$i$ (H-32)

RpRefPicAvailFlag$LX$=1 (H-33)

The variable RpRefPicAvailFlag is set to (RpRefPicAvailFlagL0||RpRefPicAvailFlagL1).

When RpRefPicAvailFlag is equal to 1, the following applies for $X$, where $X$∈{0,1}: (O-3)

When $X$ is equal to 0 or the current slice is a $B$ slice the following applies: (O-4)

For $i$ in the range from 0 to NumActiveRefLayerPics−1, inclusive, the following applies: (O-5)

The variable refViewIdx is set equal to ViewIdx (RefPicList$X$[$i$]). (O-6)

The variable RefRpRefAvailFlag$LX$[refViewIdx] is set equal to 0. (O-7)

When RpRefPicAvailFlag$LX$ is equal to 1 and there is a picture pic$A$ in the DPB (decoded picture buffer) with PicOrderCnt(pic$A$) equal to PicOrderCnt(RefPicList$X$[RpRefIdx$LX$]), ViewIdx (pic$A$) equal to refViewIdx, DepthFlag(pic$A$) equal to 0 and marked as "used for reference", RefRpRefAvailFlag$LX$[refViewIdx] is set equal to 1. (O-8)

The loop corresponding to step (O-1) checks through all indexes of the reference pictures to determine whether a reference picture in the list is available. PicOrderCntVal in step O-2 corresponds to the POC (picture order count) of the current picture. Variable num_ref_idx_lX_active_minus1 is related to the number of the reference pictures in the list. When a reference picture is available, the index of this reference picture is assigned to RpRefIdxLX as shown in step (H-32) and the available flag is set as shown in step (H-33). In the rest of the procedures (steps O-3 through O-8), the process checks if the reference picture in the reference view is in the decoded picture buffer and marked as "used for reference", if the reference picture is a texture picture (i.e., a non-depth picture), and the view index.

As described above, the existing ARP according to HTM-9.0 has issues with memory access efficiency due to reference picture change from slice to slice. The existing ARP according to HTM-9.0 may have performance issues when a MV is scaled to the reference picture in the opposite direction while a reference picture in the same direction is available as illustrated in FIG. 3. Therefore, it is desirable to develop a method for 3D or multi-view coding to overcome these issues.

BRIEF SUMMARY OF THE INVENTION

A method of video coding for three-dimensional or multi-view video encoding or decoding utilizing ARP (advanced residual prediction) by explicitly signaling the temporal reference picture is disclosed. To encode or decode a current block in a current picture from a dependent view, a corresponding block in a reference view corresponding to the current block is first determined based on a DV (disparity vector). The temporal reference picture in the reference view of the corresponding block is then explicitly signaled using one or more syntax elements in a slice header at the encoder side. For a decoder side, the temporal reference picture in the reference view of the corresponding block is determined according to said one or more syntax elements in the slice header. The temporal reference picture is then used for ARP. For example, if the current block is a temporal-prediction block using a current motion vector, the corresponding block is determined according to a derived DV derived from neighboring blocks of the current block. The current prediction residuals in the dependent view correspond to the temporally predicted residuals of the current block using the current motion vector, and the reference prediction residuals in the reference view correspond to the temporally predicted residuals of the corresponding block using the current motion vector. If the current block is inter-view predicted using a current DV, the corresponding block is determined according to the current DV, the current prediction residuals correspond to the inter-view residuals between the current block and the corresponding block, and the reference prediction residuals correspond to the inter-view residuals between the current temporal reference block and the reference-view temporal reference block.

According to one embodiment of the present invention, the syntax elements are incorporated in the slice header for each reference picture list in a current view. The syntax elements can be incorporated in the slice header for each reference picture list in all reference views. Also, the syntax elements incorporated in the slice header may correspond to a delta POC (picture order count) between the POC of the reference picture of the corresponding block and the POC of the current picture. In yet another embodiment, the syntax elements incorporated in the slice header correspond to an index pointing to one reference picture in the RPS (reference picture set) to indicate a delta POC between the POC of the reference picture of the corresponding block for each list and the POC of the current picture.

A method of video coding for three-dimensional or multi-view video encoding or decoding utilizing ARP (advanced residual prediction) by deriving the temporal reference picture at the encoder and decoder using an identical process is disclosed. The current POC of the current picture is determined. The temporal reference picture from reference picture list 0, reference picture list 1 or both the reference picture list 0 and the reference picture list 1 in the reference view of the corresponding block is determined according to the smallest absolute POC difference with the POC of the current picture. If more than one temporal reference picture has the smallest absolute POC difference, the temporal reference picture is determined according to the smallest POC among the multiple temporal reference pictures. The temporal reference picture in the reference view are used for encoding or decoding the current block for all slices and for both the reference picture list 0 and the reference picture list 1 in the dependent view and in the reference view.

DETAILED DESCRIPTION OF THE INVENTION

As described above, the first temporal reference picture in the reference picture list is used as the reference picture for the corresponding block according to the existing standard development, HTM-9.0. Thus, even a change of reference list reordering between slices in the same picture may cause the reference picture of the corresponding block to change from slice to slice, which causes negative impact on the DRAM memory access efficiency. Accordingly, the present invention imposes constraint on the reference picture selection for the corresponding blocks in the corresponding picture from a reference view. One embodiment of the present invention is to prohibit any change of the reference picture of the corresponding block within a picture. Exemplary syntax changes are disclosed to enforce this restriction since the desired reference may no longer be the first one in the list for the slices in a picture. One exemplary syntax design is illustrated s follows.

When ARP is valid and enabled for a current slice/picture, a method according to one embodiment will signalling the reference picture of the corresponding block. The choice of the reference picture is still made available to each slice in order to preserve error resiliency. Accordingly, a new syntax element is added to the slice header to signal the reference index of the list-0/list-1 temporal reference picture for the current view to achieve this goal. The new syntax element indicates the reference index of the reference picture of the corresponding block for each list, which can be signaled starting from 0 or −1, where −1 can be used to indicate no reference picture available. This value is semantically restricted to always point to the same reference picture for every slice in a picture for each list.

This representation results in the smallest possible binarization (1 bit) for the standard case, where the first entry of the list is the collocated reference, thereby having negligible impact on coding efficiency. It also provides additional flexibility to the encoder to choose an arbitrary collocated reference. Table 1 illustrates an exemplary syntax design to support reference picture signaling for each slice.

TABLE 1

| | |
|---|---|
| ... | |
| if (slice_type != I){ | |
|    ARP_Ref_l0_curr_view | ue(v)/ae(v) |
|    if( slice_type = = B ) | |
|       ARP_Ref_l1_curr_view | ue(v)/ae(v) |
| } | |
| .... | |

ARP_ref_lX_curr_view specifies the reference index of the reference picture used for the residual prediction in list X. The value of ARP_ref_lX_curr_view shall be in the range from 0 to num_ref_idx_lX_active_minus1, inclusive. As shown in Table 1, as long as the slice is not an I-slice as indicated by the test, slice_type!=I, a syntax element, ARP_Ref_l0_curr_view corresponding to the reference picture index for list 0 is incorporated. Furthermore, when the current slice is a B-slice, a syntax element, ARP_Ref_l1_curr_view corresponding to the reference picture index for list 1 is incorporated. In order to fulfill bitstream conformance, the picture referred by ARP_Ref_l0_curr_view are set to be the same for all slices of a coded picture. The syntax element, ARP_Ref_lX_curr_view (X∈{0, 1}) can be signaled starting from 0 or −1. When it is signaled as −1, it means no valid ARP reference is available to generate the list X predicting residual signal. In another example according to the present invention, a flag is used to indicate whether there is a valid ARP reference available to generate the list X predicting residual signal. In this case, the ARP_Ref_lX_curr_view (X=0 or 1) can be signaled starting from 0.

The derivation process for the target reference index for residual prediction according to one embodiment of the present invention is illustrated as below. This process is invoked when the current slice is a P or B slice. The variables RpRefIdxL0 and RpRefIdxL1 are set equal to −1, the variables RpRefPicAvailFlagL0 and RpRefPicAvailFlagL1 are set equal to 0.

The following procedure applies for X, where X∈{0, 1},
When X is equal to 0 or the current slice is a B slice, the following applies:

When ARP_Ref_lX_curr_view≥0, the following
applies: (A-1)

RpRefIdx*LX*=ARP_Ref_*lX*_curr_view (H-32A)

RpRefPicAvailFlag*LX*=1 (H-33)

The rest derivation process is the same as the existing 3D-HEVC standard development and is not repeated here. Compared with the existing 3D-HEVC standard development, the original procedure in steps (O-1) and (O-2) are replaced by procedure (A-1). Furthermore, equation (H-32) is modified to equation (H-32A).

According to another embodiment, a new syntax element is added to the slice header to signal the reference index of the list-0/list-1 reference picture for current view and all reference views to achieve the goal. The exemplary syntax design is shown in Table 2.

TABLE 2

| | |
|---|---|
| ... | |
| if (slice_type != I){ | |
|    ARP_Ref_l0_curr_view | ue(v)/ae(v) |
|    if( slice_type = = B ) | |
|       ARP_Ref_l1_curr_view | ue(v)/ae(v) |
| } | |
| for( i = 0; i < NumActiveRefLayerPics; i++ ) { | |
|    if (slice_type != I){ | |
|       ARP_Ref_l0_ref_view[i] | ue(v)/ae(v) |
|       if( slice_type = = B ) | |
|          ARP_Ref_l1_ref_view[i] | ue(v)/ae(v) |
| } | |
| .... | |

In order to fulfill bitstream conformance, the POC (picture order count) of the picture referred to by ARP_Ref_lX_curr_view and the POC of the picture referred by ARP_Ref_lX_ref_view[i] for each view are set to be the same for all slices of a coded picture.

Other changes to the derivation process for the target reference index for residual prediction may also be used to practice the present invention. For example, the collocated reference picture can be identified by the delta POC rather than the reference index. In this case, a new syntax element is transmitted in the bitstream to signal the delta POC of the reference used to generate the predicting residual signal. Current view and all reference view use this delta POC and the POC of current picture to calculate the POC of the reference picture. Also, all views use that reference picture with this POC value to perform residual prediction. Accordingly, the syntax design of Table 1 can be changed as shown in Table 3.

TABLE 3

| | |
|---|---|
| if (slice_type != I){ | |
|    ARP_Ref_l0_delta_POC | ue(v)/ae(v) |
|    if( slice_type = = B ){ | |
|       ARP_Ref_l1_delta_POC | ue(v)/ae(v) |
| } | |

The derivation process for the target reference index for residual prediction according to this embodiment is illustrated as below. This process is invoked when the current slice is a P or B slice. The variables RpRefIdxL0 and RpRefIdxL1 are set equal to −1, the variables RpRefPicAvailFlagL0 and RpRefPicAvailFlagL1 are set equal to 0.

The following procedure applies for X, where X∈{0, 1},
When X is equal to 0 or the current slice is a B slice, the following applies:

For i in the range from 0 to num_ref_idx_*lX*_active_
minus1, inclusive, the following applies: (O-1)

When PicOrderCnt(RefPicList*X*[i])!=PicOrderCntVal,
RpRefPicAvailFlag*LX*==0, and PicOrderCnt
(RefPicList*X*[i])==ARP_Ref_*lX*_delta_POC+
PicOrderCntVal, the following applies: (B-1)

RpRefIdx*LX*=i (H-32)

RpRefPicAvailFlag*LX*=1 (H-33)

The rest derivation process is the same as the existing 3D-HEVC standard development and is not repeated here.

Compared with the existing 3D-HEVC standard development, the original procedure in step (O-2) is replaced by the procedure in step (B-1).

In yet another embodiment, a new syntax element is transmitted in the bitstream to signal the index for indicating which element of the RPS (reference picture set) is used as the reference picture for the residual prediction. One example of syntax design according to this embodiment is shown in Table 4. The ARP_Ref_l0_delta_POC_idx_in_RPS is used to indicate the delta POC for the list 0 reference picture used to generate the predicting residual signal and ARP_Ref_l1_delta_POC_idx_in_RPS is used to indicate the delta POC for the list 1 reference picture used to generate the predicting residual signal.

TABLE 4

| if (slice_type != I){ | |
|---|---|
| ARP_Ref_l0_delta_POC_idx | ue(v)/ae(v) |
| if( slice_type == B ){ | |
| ARP_Ref_l0_delta_POC_idx | ue(v)/ae(v) |
| } | |

In yet another embodiment, no new syntax element is introduced. The reference pictures for the residual prediction for the current view and the reference views are derived at both the encoder and the decoder through an identical derivation process.

In the first example of the identical derivation process, list-0 reference picture for residual prediction is selected as the one having the smallest absolute POC difference compared to the POC of current picture in list 0. When more than one reference picture has the smallest absolute POC difference, the one having a smaller POC value compared to current picture is used first. The list 1 reference picture for residual prediction is selected as the one having the smallest absolute POC difference compared to the POC of current picture in list 1. When more than one reference picture has the smallest absolute POC difference, the one having larger POC value compared to current picture is used first.

According to the above example of the identical derivation process, the derivation process for the target reference index for residual prediction is described as follows. This process is invoked when the current slice is a P or B slice. The variables RpRefIdxL0 and RpRefIdxL1 are set equal to −1, the variables RpRefPicAvailFlagL0 and RpRefPicAvailFlagL1 are set equal to 0.

The following procedure applies for X, where X∈{0, 1}, When X is equal to 0 or the current slice is a B slice the following applies:

Set diffPOC equal to $2^{15}-1$ (C-1)

Set Idx=−1 (C-2)

For $i$ in the range from 0 to num_ref_idx_$lX$_active_minus1, inclusive, the following applies: (C-3)

If PicOrderCnt(RefPicList$X$[$i$])!=PicOrderCntVal and abs(PicOrderCnt(RefPicList$X$[$i$])−PicOrderCntVal)<diffPOC, the following applies: (C-4)

Idx=$i$ (H-32a)

diffPOC=abs(PicOrderCnt(RefPicList$X$[$i$])−PicOrderCntVal) (H-33a)

Else If PicOrderCnt(RefPicList$X$[$i$])!=PicOrderCntVal and abs(PicOrderCnt(RefPicList$X$[$i$])−PicOrderCntVal)==diffPOC, the following applies: (C-5)

If ($X$==0 and PicOrderCnt(RefPicList$X$[$i$])<PicOrderCntVal) or ($X$==1 and PicOrderCnt(RefPicList$X$[$i$])>PicOrderCntVal), the following applies: (C-6)

Idx=$i$ (H-32b)

diffPOC=abs(PicOrderCnt(RefPicList$X$[$i$])−PicOrderCntVal) (H-33b)

If Idx≥0, the following applies: (C-7)

RpRefIdx$LX$=Idx (C-8)

RpRefPicAvailFlag$LX$=1 (C-9)

The rest derivation process is the same as the existing 3D-HEVC standard development and is not repeated here. The loop corresponding to step C-3 looks for a reference picture with a smallest absolute POC difference as shown in step C-4 and equations H-32a and H-33a. When there is more than one reference picture having the smallest absolute POC difference, the one with a smallest POC is selected for list 0 and the one with a largest POC is selected for list 1 as shown in steps C-5, C-6 and equations H-32b and H-33b. If a reference picture is found, the index and the reference picture available flag are set as shown in steps C7 through C-9.

In the second example of the identical derivation process, the list 0 reference picture for residual prediction is selected as the one having the smallest QP (quantization parameter) in list 0. A reconstructed picture with a smaller QP implies a better picture quality. When more than one reference picture has the smallest QP, the one with a POC smaller than the POC of the current picture and has the smallest absolute POC difference compared to the POC of the current picture is selected as the list 0 reference picture for residual prediction. The list 1 reference picture for residual prediction is selected as the one having the smallest QP in list 1. When more than one reference picture have the smallest QP, the one with the POC larger than the POC of the current picture and has the smallest absolute POC difference compared to the POC of the current picture is selected as the list 1 reference picture for residual prediction.

In the third example of the identical derivation process, the list X reference picture for residual prediction is selected from the one that has the smallest absolute POC difference compared to the POC of the current picture, where X∈{0, 1}. When more than one reference picture has the smallest absolute POC difference, the one having smaller POC value is used first.

In the fourth example of the identical derivation process, the list X reference picture for residual prediction is selected from the one that has the smallest absolute POC difference compared to the POC of the current picture, where X∈{0, 1}. When more than one reference picture has the smallest absolute POC difference, the one having smaller reference picture index value is used first.

According to the above example of the identical derivation process, the derivation process for the target reference index for residual prediction is described as follows. This process is invoked when the current slice is a P or B slice. The variables RpRefIdxL0 and RpRefIdxL1 are set equal to −1, the variables RpRefPicAvailFlagL0 and RpRefPicAvailFlagL1 are set equal to 0.

The following procedure applies for X, where X∈{0, 1}, When X is equal to 0 or the current slice is a B slice the following applies:

Set diffPOC equal to $2^{15}-1$ (C-1)

Set Idx=−1 (C-2)

For $i$ in the range from 0 to num_ref_idx_$LX$_active_minus1, inclusive, the following applies: (C-3)

If PicOrderCnt(RefPicList$X[i]$)!=PicOrderCntVal and abs(PicOrderCnt(RefPicList$X[i]$)−PicOrderCntVal)<diffPOC, the following applies: (C-4)

Idx=$i$ (H-32a)

diffPOC=abs(PicOrderCnt(RefPicList$X[i]$)−PicOrderCntVal) (H-33a)

If Idx≥0, the following applies: (C-7)

RpRefIdx$LX$=Idx (C-8)

RpRefPicAvailFlag$LX$=1 (C-9)

According to the present invention as disclosed above, the change in the reference picture of the corresponding block within a picture is prohibited. In other words, all slices in current view and reference view are set to use the same reference picture for residual prediction for list 0 and list 1. When the reference picture in list 0 or list 1 does not exist, the ARP for the corresponding list will be disabled according to the present invention. Alternatively, when the reference picture in list 0 or list 1 does not exist, the ARP will be disabled for both list 0 and list 1.

The performance of a 3D video coding system incorporating an embodiment of the present invention is compared with the performance of a conventional system based on HTM-9.0 as shown in Table 5. The embodiment incorporating an embodiment of the present invention derives the temporal reference picture for advanced residual prediction at the encoder and decoder through an identical derivation process without the need of explicit signaling information regarding the temporal reference picture. Instead of selecting the first temporal reference picture as HTM-9.0, the embodiment selects the reference picture closest to current coding picture (i.e., smallest POC distance) for ARP. Furthermore, according to the embodiment of the present invention, all slices within a picture will have a same reference picture for ARP. The performance comparison is based on different sets of test data listed in the first column. The BD-rate differences are shown for texture pictures in view 1 (video 1) and view 2 (video 2). A negative value in the BD-rate implies that the present invention has a better performance. As shown in Table 5, BD-rate measure for view 1 and view 2 is the same as the conventional HTM-9.0. The BD-rate measure for the coded video PSNR with video bitrate, the coded video PSNR with total bitrate (texture bitrate and depth bitrate), and the synthesized video PSNR with total bitrate are all the same as the conventional HTM-9.0. The processing times (encoding time, decoding time and rendering time) are also compared. As shown in Table 5, slight decreases in encoding time and rendering time (1.6 and 0.6%) and slight increase in decoding time (0.7%) are noted. Accordingly, the system that both the encoder and decoder derive the same reference picture for all slices in the picture according to one embodiment of the present invention achieves the same performance as the conventional HTM-9.0. However, the embodiment according to the present invention is more bandwidth efficient for DRAM memory access since there is no need to switch to a different reference picture between slices in a picture.

TABLE 5

| | Video 0 | Video 1 | Video 2 | Video PSNR/ video bitrate | Video PSNR/ total bitrate | Synth PSNR/ total bitrate | Enc time | Dec time | Ren time |
|---|---|---|---|---|---|---|---|---|---|
| Balloons | 0.0% | 0.0% | 0.0% | 0.0% | 0.0% | 0.0% | 99.9% | 110.2% | 101.3% |
| Kendo | 0.0% | 0.0% | 0.0% | 0.0% | 0.0% | 0.0% | 98.4% | 100.7% | 100.6% |
| Newspapercc | 0.0% | 0.0% | 0.0% | 0.0% | 0.0% | 0.0% | 98.5% | 96.9% | 99.8% |
| GhostTownFly | 0.0% | 0.0% | 0.0% | 0.0% | 0.0% | 0.0% | 99.0% | 96.0% | 99.9% |
| PoznanHall2 | 0.0% | 0.0% | 0.0% | 0.0% | 0.0% | 0.0% | 98.6% | 101.3% | 99.1% |
| PoznanStreet | 0.0% | 0.0% | 0.0% | 0.0% | 0.0% | 0.0% | 98.1% | 95.6% | 98.0% |
| UndoDancer | 0.0% | 0.0% | 0.0% | 0.0% | 0.0% | 0.0% | 96.1% | 96.9% | 97.7% |
| Shark | 0.0% | 0.0% | 0.0% | 0.0% | 0.0% | 0.0% | 98.9% | 108.2% | 99.0% |
| 1024 × 768 | 0.0% | 0.0% | 0.0% | 0.0% | 0.0% | 0.0% | 98.9% | 102.6% | 100.6% |
| 1920 × 1088 | 0.0% | 0.0% | 0.0% | 0.0% | 0.0% | 0.0% | 98.1% | 99.6% | 98.8% |
| average | 0.0% | 0.0% | 0.0% | 0.0% | 0.0% | 0.0% | 98.4% | 100.7% | 99.4% |

Figure 5:
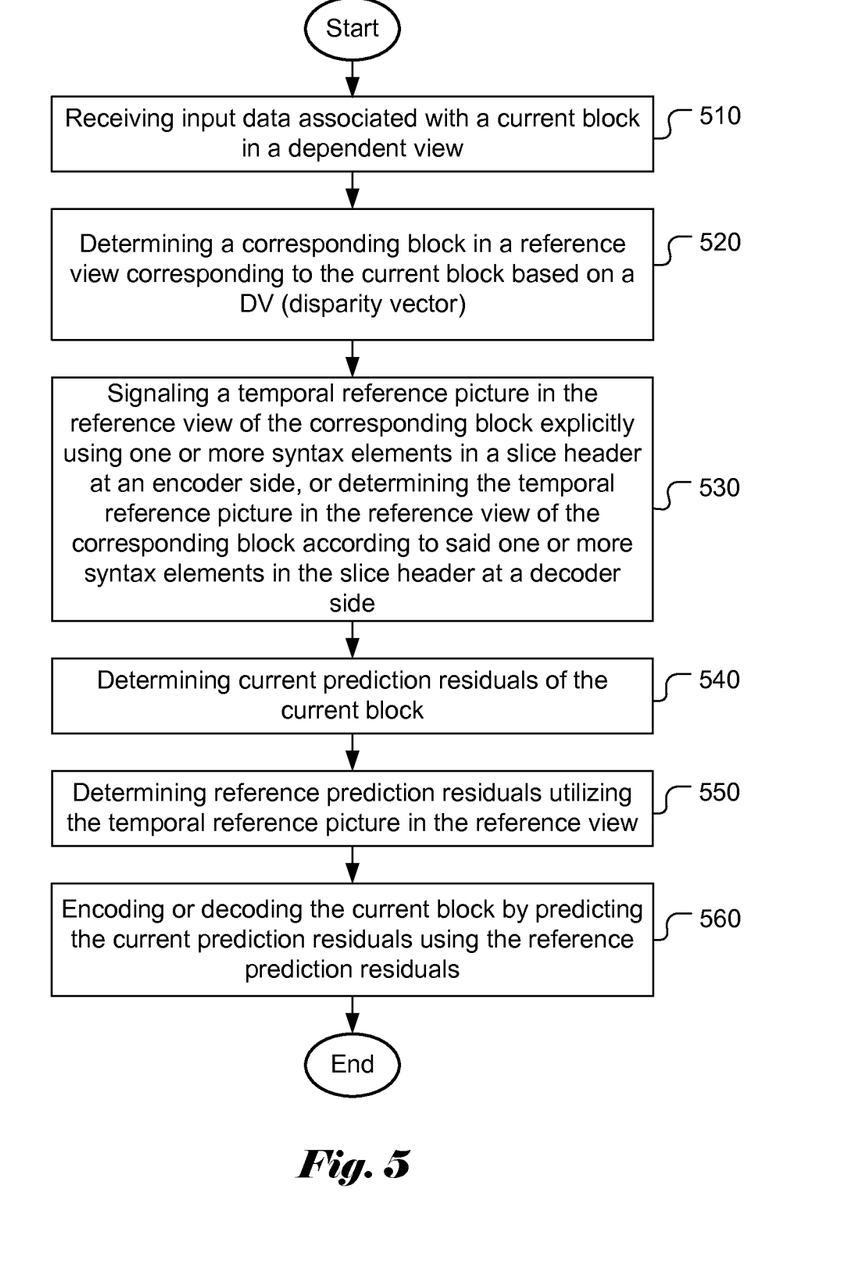
FIG. 5 illustrates an exemplary flowchart of three-dimensional or multi-view video encoding or decoding that explicitly signals the temporal reference picture of a corresponding block in the reference view associated with the current block in the dependent view.

FIG. 5 illustrates an exemplary flowchart of three-dimensional or multi-view video encoding or decoding utilizing ARP (advanced residual prediction) that explicitly signals the temporal reference picture according to an embodiment of the present invention. The system receives input data associated with a current block in a dependent view as shown in step 510. The input data may correspond to un-coded or coded texture data. The input data may be retrieved from storage such as a computer memory, buffer (RAM or DRAM) or other media. The video bitstream may also be received from a processor such as a controller, a central processing unit, a digital signal processor or electronic circuits that produce the input data. A corresponding block associated with the current block in an inter-view reference picture from a reference view is determined based on a DV (disparity vector) in step 520. A temporal reference picture in the reference view of the corresponding block is signaled explicitly using one or more syntax elements in a slice header at an encoder side, or the temporal reference picture in the reference view of the corresponding block is determined according to said one or more syntax elements in the slice header at a decoder side as shown in step 530. The current prediction residuals of the current block are determined as shown in step 540 and the reference prediction residuals are determined utilizing the temporal reference picture in the reference view as shown in step 550. The current block is then encoded or decoded by predicting the current prediction residuals using the reference prediction residuals as shown in step 560.

Figure 6:
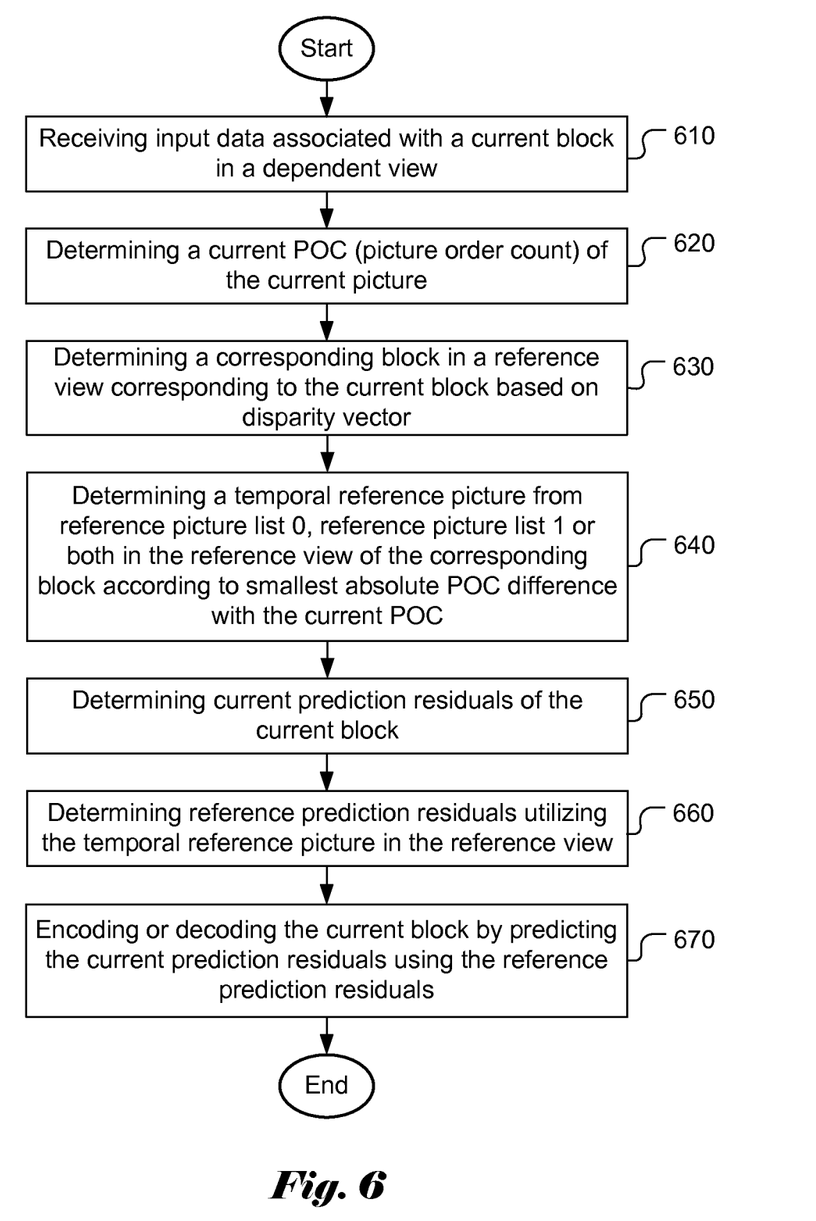
FIG. 6 illustrates an exemplary flowchart of three-dimensional or multi-view video encoding or decoding, where the temporal reference picture of a corresponding block in a reference view associated with the current block in the dependent view is derived at the encoder and the decoder through an identical derivation process.

FIG. 6 illustrates an exemplary flowchart of three-dimensional or multi-view video encoding or decoding utilizing ARP (advanced residual prediction) that derives the temporal reference picture at the encoder and decoder through an identical derivation process according to an embodiment of the present invention. The system receives input data associated with a current block in a dependent view as shown in step 610. A current POC (picture order count) of the current picture is determined in step 620. A corresponding block associated with the current block in an inter-view reference picture from a reference view is determined based on disparity vector in step 630. A temporal reference picture is determined from reference picture list 0, reference picture list 1 or both in the reference view of the corresponding block according to smallest absolute POC difference with the current POC as shown in step 640. The current prediction residuals of the current block are determined as shown in step 650 and the reference prediction residuals are determined utilizing the temporal reference picture in the reference view as shown in step 660. The current block is then encoded or decoded by predicting the current prediction residuals using the reference prediction residuals as shown in step 670.

The flowcharts shown above are intended to illustrate examples of signaling or derivation of a temporal reference picture for (ARP) advanced residual prediction. A person skilled in the art may modify each step, re-arranges the steps, split a step, or combine steps to practice the present invention without departing from the spirit of the present invention.

In an embodiment of the present invention, input data associated with a current block in a dependent view is received. The input data may correspond to un-coded or coded texture data. The input data may be retrieved from storage such as a computer memory, buffer (RAM or DRAM) or other media. A video bitstream may also be received from a processor such as a controller, a central processing unit, a digital signal processor or electronic circuits that produce the input data. A selected three-dimensional coding tool using a derived DV is determined, where the derived DV for a current block is obtained from one or more spatial neighboring block and one or more temporal neighboring block of the current block. The selected three-dimensional coding tool is applied to the current block using the derived DV if the derived DV is available. If the derived DV is not available, the selected three-dimensional coding tool is applied to the current block using a default DV, wherein the default DV is set to point to an inter-view reference picture in one reference picture list of the current block. The availability of the derived DV may be determined by checking if a first inter-view reference picture in a first view associated with the derived DV is in one reference picture list of the current block.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding for a three-dimensional or multi-view video encoding or decoding system, the method comprising:

receiving input data associated with a current block in a current picture from a dependent view;

determining a corresponding block in a reference view corresponding to the current block based on a disparity vector (DV);

signaling a temporal reference picture in the reference view of the corresponding block explicitly using one or more syntax elements in a slice header at an encoder side, or determining the temporal reference picture in the reference view of the corresponding block according to said one or more syntax elements in the slice header at a decoder side, wherein said one or more syntax elements incorporated in the slice header correspond to an index pointing to one reference picture in a reference picture set (RPS) to indicate a delta picture order count (POC) between a first POC of the reference picture of the corresponding block for each list and a second POC of the current picture, wherein the index is restricted to always point to a same reference picture for every slice in a picture for each list;

determining current prediction residuals of the current block;

determining reference prediction residuals utilizing the temporal reference picture in the reference view; and encoding or decoding the current block by predicting the current prediction residuals using the reference prediction residuals.

2. The method of claim 1, wherein when the current block is temporally predicted using a current motion vector, the corresponding block is determined according to a derived DV derived from neighboring blocks of the current block, the current prediction residuals correspond to first temporal residuals of the current block using the current motion vector, and the reference prediction residuals correspond to second temporal residuals of the corresponding block using the current motion vector.

3. The method of claim 1, wherein when the current block is inter-view predicted using a current DV, the corresponding block is determined according to the current DV, the current prediction residuals correspond to first inter-view residuals between the current block and the corresponding block, and the reference prediction residuals correspond to second inter-view residuals between a current temporal reference block and a reference-view temporal reference block, wherein the reference-view temporal reference block is located from the corresponding block using a motion vector and the current temporal reference block is located from the current block using the motion vector of the corresponding block.

4. The method of claim 1, wherein said one or more syntax elements are incorporated in the slice header for each reference picture list in a current view.

5. The method of claim 1, wherein said one or more syntax elements are incorporated in the slice header for each reference picture list in all reference views.

6. The method of claim 1, wherein the delta POC is incorporated in the slice header for each reference picture list in a current view.

7. The method of claim 1, wherein the delta POC is incorporated in the slice header for each reference picture list in all reference views.

8. The method of claim 1, wherein the index is incorporated in the slice header for each reference picture list in a current view.

9. The method of claim 1, wherein the index is incorporated in the slice header for each reference picture list in all reference views.

10. A method of video coding for a three-dimensional or multi-view video encoding or decoding system, the method comprising:
receiving input data associated with a current block in a current picture from a dependent view;
determining a current picture order count (POC) of the current picture;
determining a corresponding block in a reference view corresponding to the current block based on a disparity vector;
determining a temporal reference picture from reference picture list 0, reference picture list 1 or both in the reference view of the corresponding block according to a smallest absolute POC difference with the current POC, wherein if more than one temporal reference picture has the smallest absolute POC difference, the temporal reference picture is determined according to smallest reference picture index value among said more than one temporal reference picture;
when determining the temporal reference picture from the reference picture list 0, if more than one temporal reference picture has the smallest absolute POC difference, utilizing a temporal reference picture of the more than one temporal reference pictures that has a smaller POC value compared to the current picture to determine reference prediction residuals;
when determining the temporal reference picture from the reference picture list 1, if more than one temporal reference picture has the smallest absolute POC difference, utilizing a temporal reference picture of the more than one temporal reference pictures that has a larger POC value compared to the current picture to determine the reference prediction residuals;
determining current prediction residuals of the current block;
determining reference prediction residuals utilizing the temporal reference picture in the reference view; and
encoding or decoding the current block by predicting the current prediction residuals using the reference prediction residuals.

11. The method of claim 10, wherein when the current block is temporally predicted using a current motion vector, the corresponding block is determined according to a derived DV derived from neighboring blocks of the current block, the current prediction residuals correspond to first temporal residuals of the current block using the current motion vector, and the reference prediction residuals correspond to second temporal residuals of the corresponding block using the current motion vector.

12. The method of claim 10, wherein when the current block is inter-view predicted using the disparity vector, the current prediction residuals correspond to first inter-view residuals between the current block and the corresponding block, and the reference prediction residuals correspond to second inter-view residuals between a current temporal reference block and a reference-view temporal reference block, wherein the reference-view temporal reference block is located from the corresponding block using a motion vector and the current temporal reference block is located from the current block using the motion vector of the corresponding block.

13. The method of claim 10, wherein if more than one temporal reference picture has the smallest absolute POC difference, the temporal reference picture is determined according to smallest POC among said more than one temporal reference picture.

14. The method of claim 10, wherein said determining reference prediction residuals utilizes the temporal reference picture in the reference view for said encoding or decoding the current block for all slices and for both the reference picture list 0 and the reference picture list 1 in the dependent view and in the reference view.

15. An apparatus for video coding in a three-dimensional or multi-view video encoding or decoding system, the apparatus comprising one or more electronic circuits configured to:
receive input data associated with a current block in a current picture from a dependent view;
determine a current picture order count (POC) of the current picture;
determine a corresponding block in a reference view corresponding to the current block based on a disparity vector;
determine a temporal reference picture from reference picture list 0, reference picture list 1 or both in the reference view of the corresponding block according to a smallest absolute POC difference with the current POC, wherein if more than one temporal reference picture has the smallest absolute POC difference, the temporal reference picture is determined according to smallest reference picture index value among said more than one temporal reference picture;
when determining the temporal reference picture from the reference picture list 0, if more than one temporal reference picture has the smallest absolute POC difference, utilizing a temporal reference picture of the more than one temporal reference pictures that has a smaller POC value compared to the current picture to determine reference prediction residuals;

when determining the temporal reference picture from the reference picture list 1, if more than one temporal reference picture has the smallest absolute POC difference, utilizing a temporal reference picture of the more than one temporal reference pictures that has a larger POC value compared to the current picture to determine the reference prediction residuals;

determine current prediction residuals of the current block;

determine reference prediction residuals utilizing the temporal reference picture in the reference view; and encode or decode the current block by predicting the current prediction residuals using the reference prediction residuals.

* * * * *